(12) United States Patent
Miyazawa et al.

(10) Patent No.: US 7,032,824 B2
(45) Date of Patent: Apr. 25, 2006

(54) SCANNER

(75) Inventors: Kenichi Miyazawa, Inagi (JP); Toshiyuki Ichikawa, Inagi (JP); Noboru Ishii, Inagi (JP); Keiichiro Shiraki, Inagi (JP); Isao Ariga, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 129 days.

(21) Appl. No.: 10/763,246

(22) Filed: Jan. 26, 2004

(65) Prior Publication Data

US 2004/0178272 A1    Sep. 16, 2004

(30) Foreign Application Priority Data

Mar. 14, 2003    (JP) .............................. 2003-070789

(51) Int. Cl.
*G06K 7/10*    (2006.01)
(52) U.S. Cl. ............................................. 235/462.43
(58) Field of Classification Search ........... 235/462.43; 361/681
See application file for complete search history.

(56) References Cited

U.S. PATENT DOCUMENTS 5,529,522 A * 6/1996 Huang ........................ 439/460
5,838,536 A * 11/1998 Miyazawa et al. .......... 361/681

FOREIGN PATENT DOCUMENTS

| JP | 4-162596 | 6/1992 |
|----|----------|--------|
| JP | 5-21968  | 1/1993 |
| JP | 5-46801  | 2/1993 |

* cited by examiner

*Primary Examiner*—Michael G. Lee
*Assistant Examiner*—Lisa M. Caputo
(74) *Attorney, Agent, or Firm*—Arent Fox PLLC

(57) ABSTRACT

The scanner has a body having a scanning unit, a display device, a keypad, a holding member holding together the display and the keypad, a mounting structure for mounting the holding member to the body, and a cable holder having a holding part for holding a plurality of cables and arranged in a floating state at one of the keypad and the display. The cable holder has two side walls and a bottom wall, with grooves at the tops of the side walls. Cables are arranged in the grooves and pressed by a part of the holding member when the holding member is attached to the display device and the keypad.

9 Claims, 8 Drawing Sheets

SCANNER

BACKGROUND OF THE INVENTION

1. Field of the Invention

The present invention relates to a scanner used in, for example, a POS system.

2. Description of the Related Art

A scanner used in a POS system includes a scanning unit (bar code scanner) and a keyboard and is designed to be able to not only read a bar code provided on an object by the scanning unit, but also have information input by the keyboard (for example, see Japanese Unexamined Patent Publication (Kokai) No. 5-46801). The body of the scanning unit is formed in the shape of a stand, while the keyboard is attached tiltably to the body.

In a scanner used in a POS system, sometimes an input means called an electronic multipurpose keyboard is provided. The electronic multipurpose keyboard includes a display device including a touch panel and a keypad. The display device and the keypad are supported by the body of the scanning unit.

In a scanner including an electronic multipurpose keyboard, a plurality of cables extend between the keypad and the scanning unit, between the display device and the scanning unit, and between the display and the keypad. At the time of assembly work of the scanner, the display device and the keypad and the related support members are assembled in a state where the plurality of cables freely move. Therefore, at the time of assembly work, the cables interfere, the cables end up being pinched, and the work efficiency of assembly becomes lower.

Further, the display device and the keypad sometimes have to be treated to prevent noise due to static electricity. This becomes a cause of increased cost.

SUMMARY OF THE INVENTION

An object of the present invention is to provide a scanner superior in work efficiency at the time of assembly.

The scanner, according to the present invention, comprises a body having a scanning unit, a display device, a keypad, a holding member holding the display device and the keypad together, a mounting structure for mounting the holding member to the body, and a cable holder having a holding part for holding a plurality of cables and arranged in a floating state at one of the keypad and the display device, wherein the holding member has a contact part brought into contact with cables held by the cable holder when the holding member is attached to the keypad, each of the cables include a plurality of wires, a shield braiding surrounding the wires, and a covering surrounding the shield braiding, and the contact part of the holding member contacts the shield braidings of the cables.

According to this configuration, the display device and the keypad are held together by the holding member. The plurality of cables are held as a unit by a cable holder. The cable holder is arranged at one of the keypad and the display device. The cable holder can move, but is held at a substantially constant position. Therefore, the plurality of cables are held together at a predetermined position at the time of assembly, so do not interfere with the assembly work. The work efficiency at assembly is therefore improved.

DESCRIPTION OF THE PREFERRED EMBODIMENTS

The preferred embodiments of the present invention will now be explained with reference to the drawings.

Figure 1:
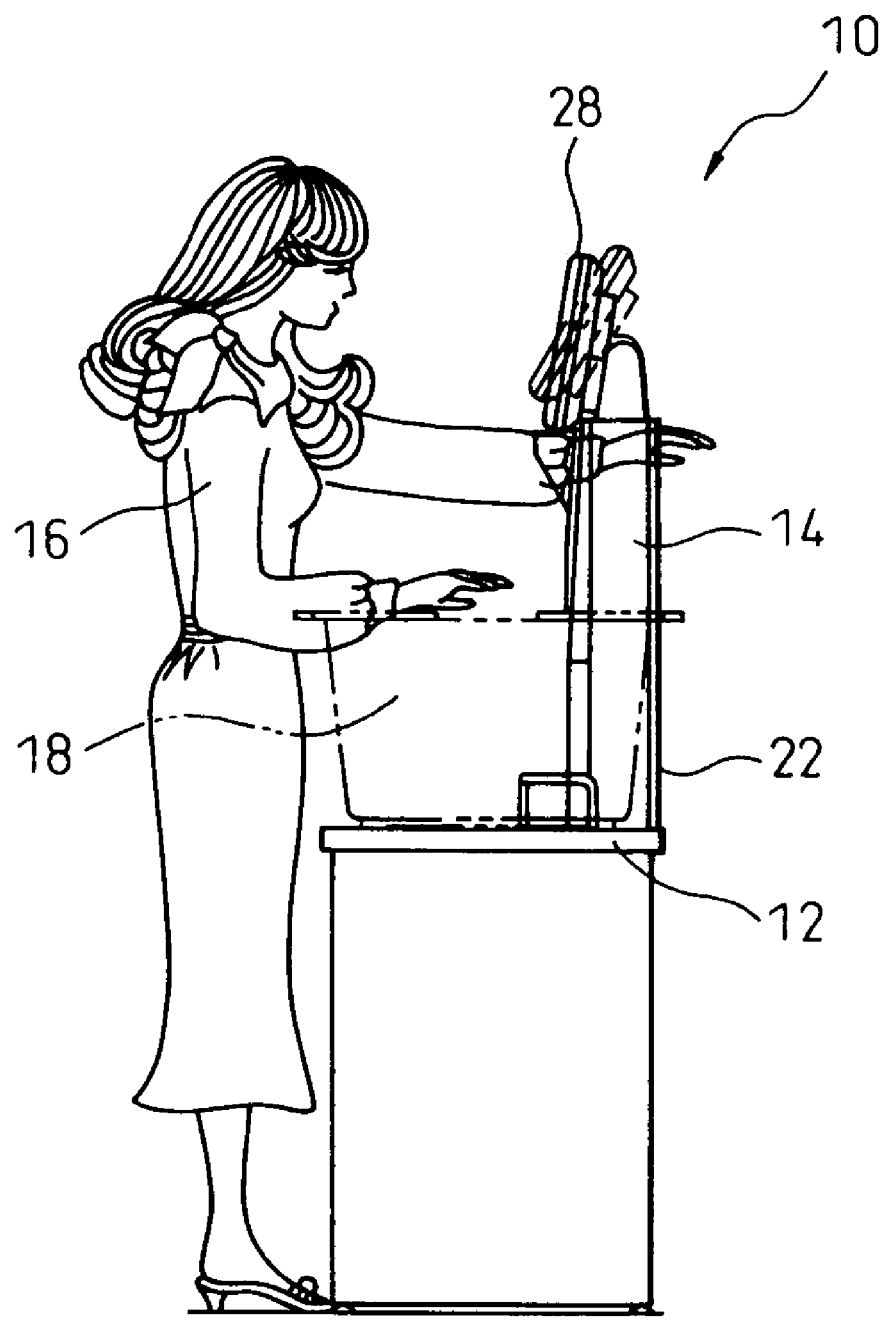
FIG. 1 is a side view of a POS system utilizing the present invention.
Figure 2:
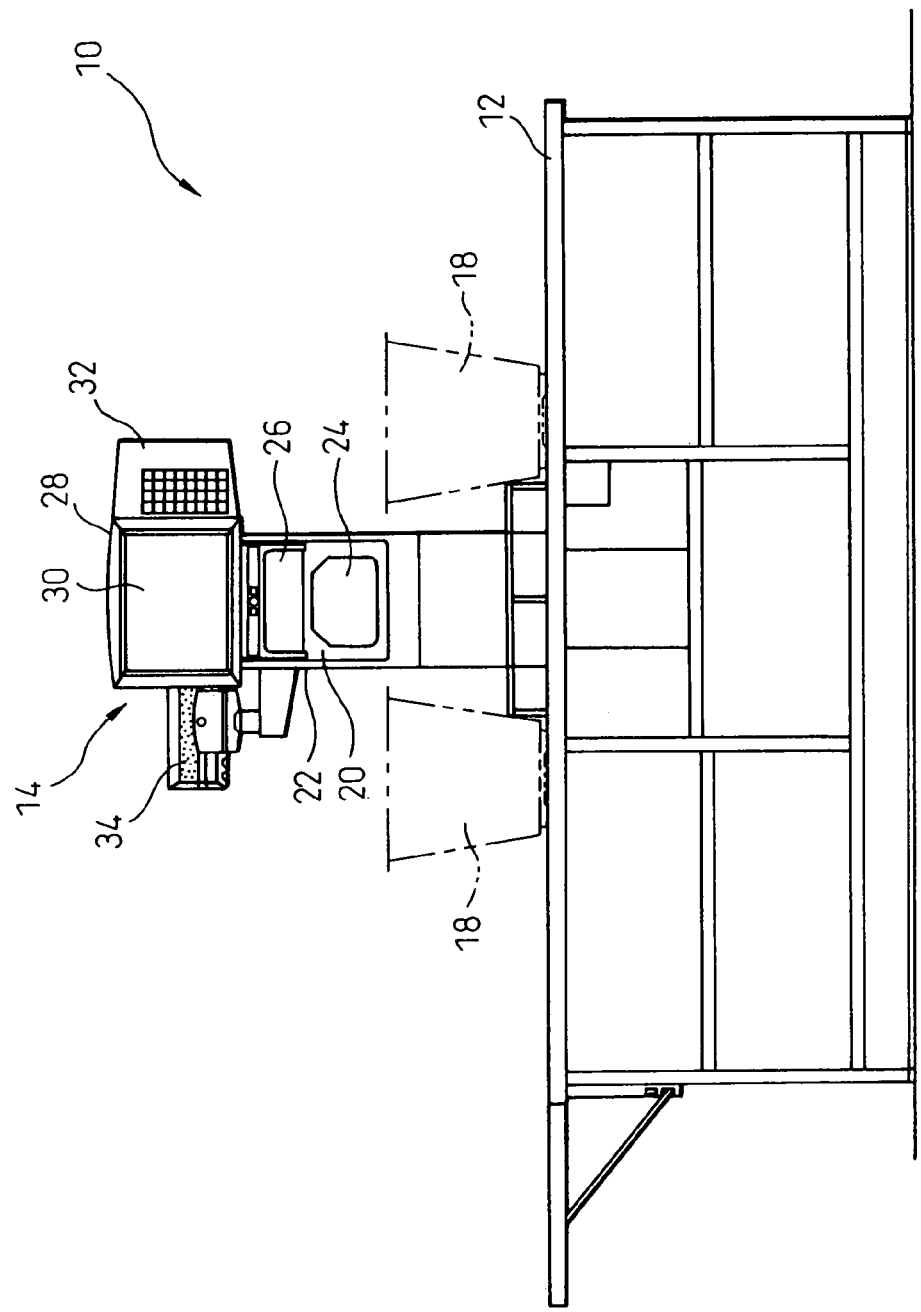
FIG. 2 is a front view of the POS system of FIG. 1.

FIG. 1 is a side view of a scanner utilizing the present invention. FIG. 2 is a front view of the POS system of FIG. 1. In FIGS. 1 and 2, a POS system 10 includes a scanner 14 which is arranged on a table 12. An operator 16 stands in front of the table 12, takes out objects from a shopping basket 18, and scans them by the scanner 14.

The scanner 14 includes a scanning unit 20 which is arranged in a stand-shaped body 22. The scanning unit 20 has a substantially vertical first reading window 24 and a second reading window 26 protruding a little in front of the first reading window 24 and inclined facing downward. The laser scanning light emitted from the first reading window 24 and the second reading window 26 strike the bar code provided on an object. The reflected light is read by a detecting means provided in the scanning unit 20.

The scanner 14 further includes an electronic multipurpose keyboard 28. The electronic multipurpose keyboard 28 includes a display device 30 and a keypad 32 arranged side by side. The display device 30 comprises a liquid crystal display device, but may also be made another display device. The display device 30 includes a touch panel on its surface. By depressing the touch panel by a finger, it is possible to input information. The keypad 32 includes a plurality of keys. Therefore, in this scanner 14, it is possible to not only read a bar code provided on an object by the scanning unit 20, but also to input information by the electronic multipurpose keyboard 28 (display device 30 and keypad 32). Further, a customer display device 34 is attached to the body 22 of the scanning unit 20.

Figure 3:
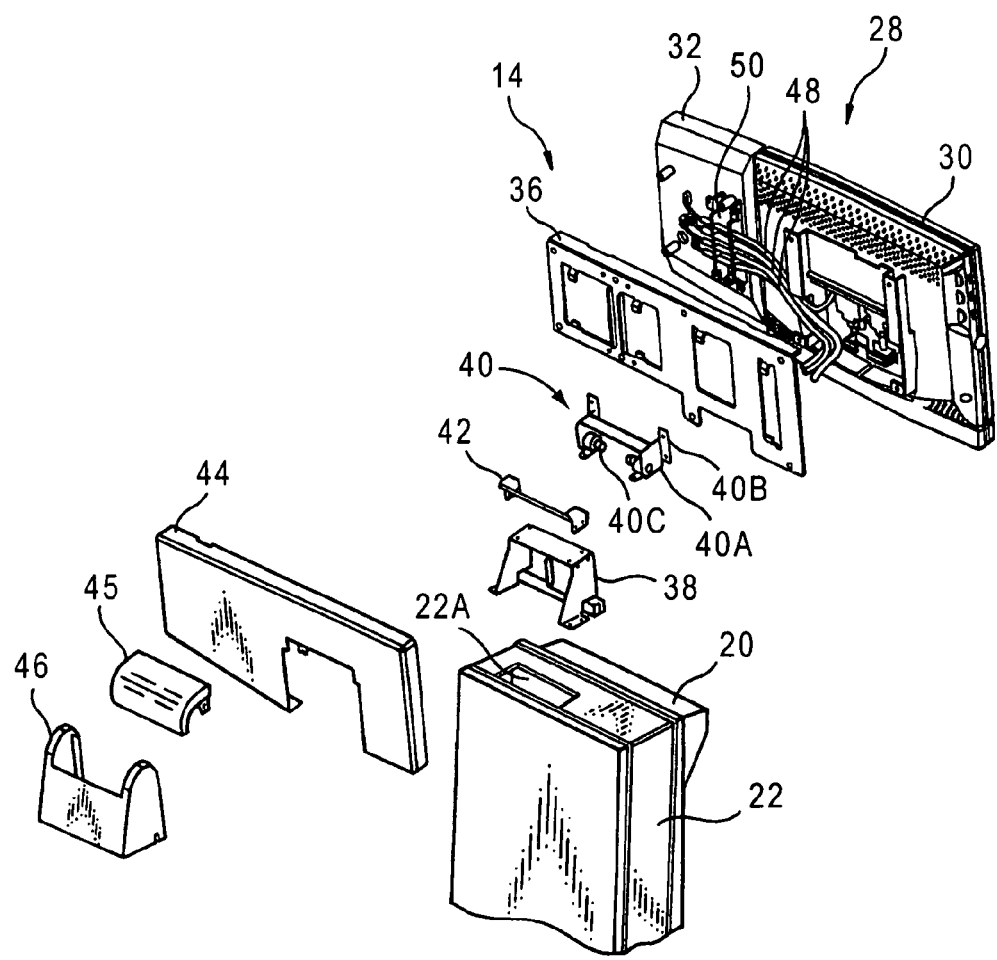
FIG. 3 is an exploded perspective view of a display device and a keypad and related support members of a scanner of the POS system of FIGS. 1 and 2.

FIG. 3 is an exploded perspective view of the display device 30 and the keypad 32 and related support members of the scanner 14 of the POS system of FIGS. 1 and 2. In FIG. 3, the back sides of the display device 30 and the keypad 32 are seen. The top of the body 22 of the scanning unit 20 is provided with an opening 22A. The scanner 14 is provided with a holding plate 36 for holding together the display device 30 and the keypad 32 of the electronic multipurpose keyboard 28 and a mounting structure for mounting the holding plate 36 to the body 22 of the scanning unit 20.

The mounting structure is provided with a base to be fixed to the walls on the two sides of the opening 22A at the top of the body 22 and a hinge support member 40 to be fixed to the holding plate 36. The hinge support member 40 has a first part 40A to be fixed to the base 38, a second part 40B to be fixed to the holding plate 36, and a hinge part 40C coupling the first part 40A and second part 40B in a swivelable manner. Therefore, after assembly of the scanner 14, the holding plate 36 (electronic multipurpose keyboard 28) can swivel about a horizontal axis on the body 22. The member 42 is attached to the hinge support member 40 and restricts the swivel action of the holding plate 36 (electronic multipurpose keyboard 28). Further, covers 44, 45, and 46 are provided.

Figure 4:
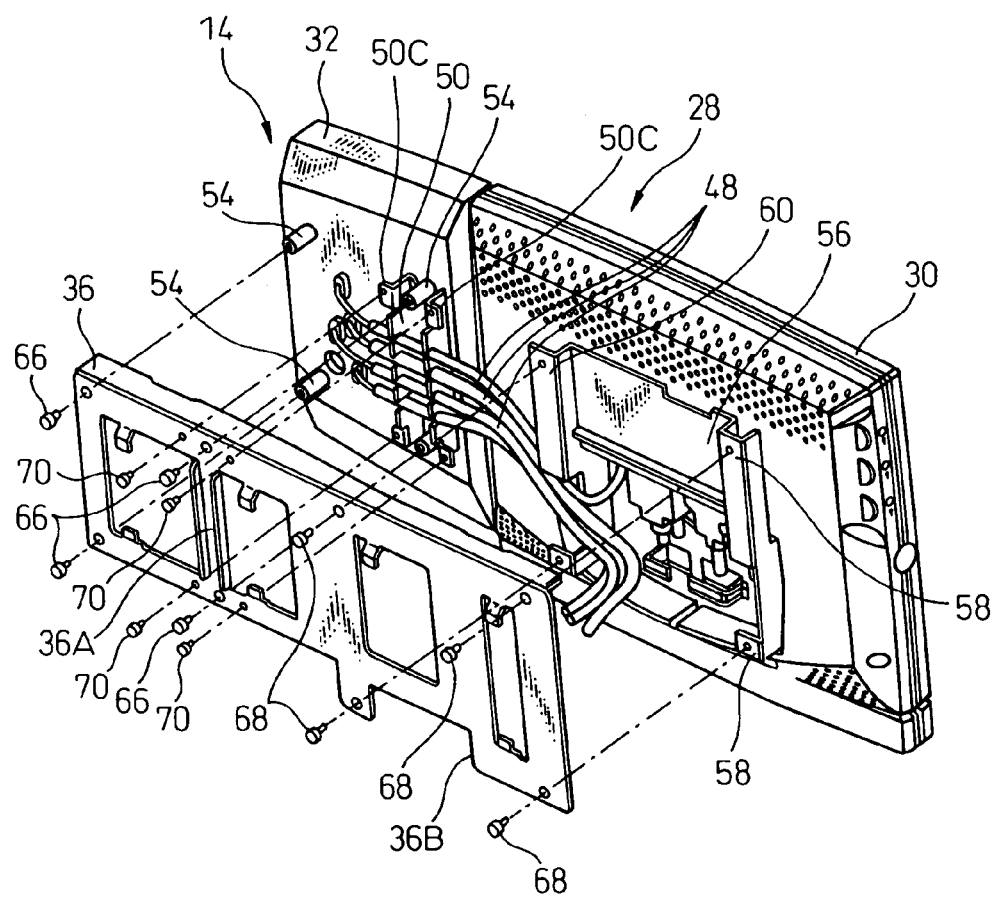
FIG. 4 is an enlarged exploded perspective view of the scanner of FIG. 3.

FIG. 4 is an enlarged exploded perspective view of the scanner 14 of FIG. 3. In FIGS. 3 and 4, the scanner 14 is provided with a cable holder 50 in a floating state at one of the keypad 32 and the display device 30 in order to hold a plurality of cables 48. In the illustrated embodiment, the cable holder 50 is arranged at the keypad 32.

Figure 5:
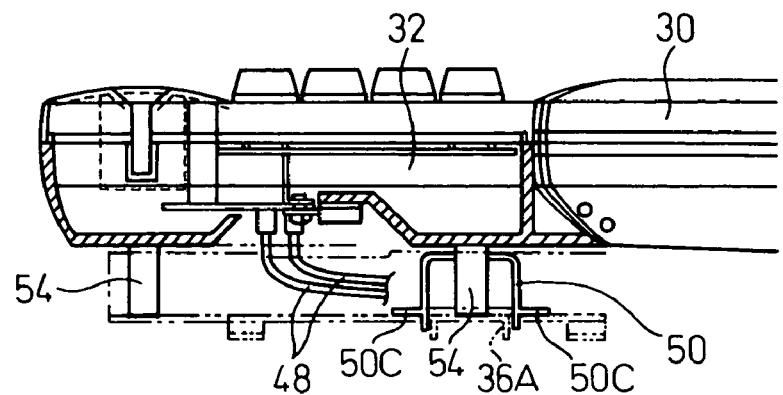
FIG. 5 is a horizontal sectional view of the display device and the keypad of FIG. 4.
Figure 6:
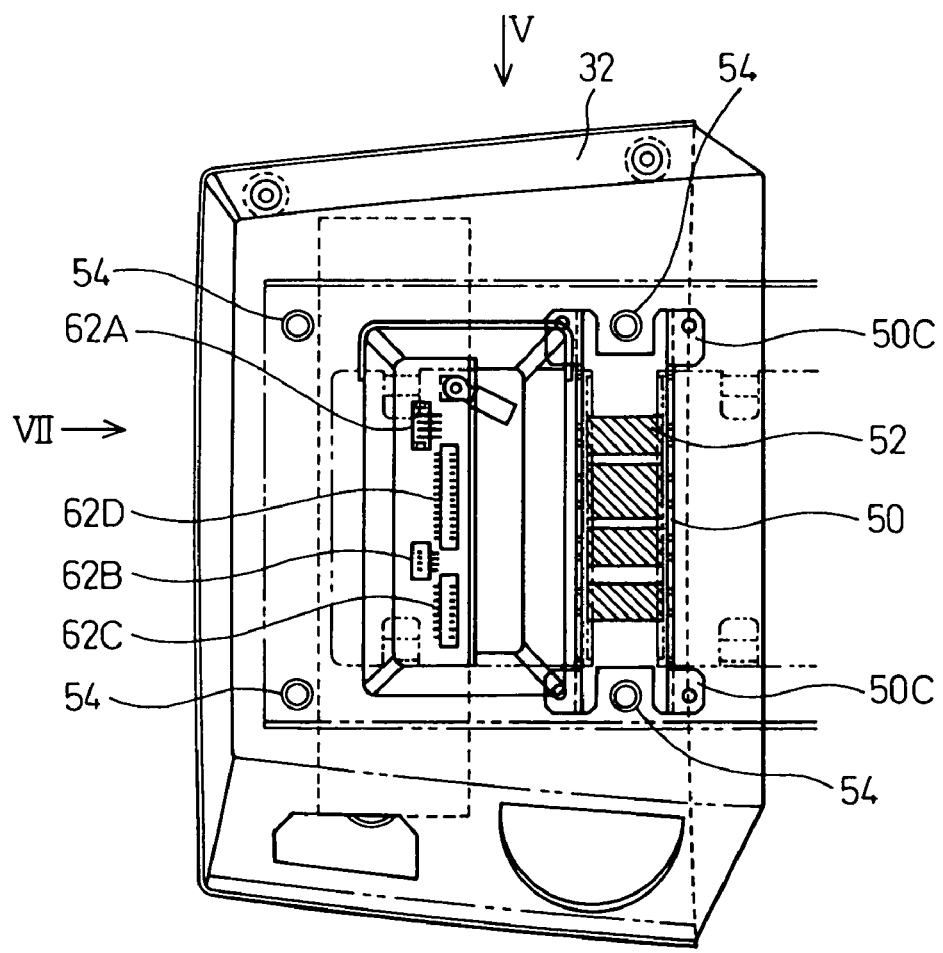
FIG. 6 is a plan view of the keypad of FIG. 5.
Figure 7:
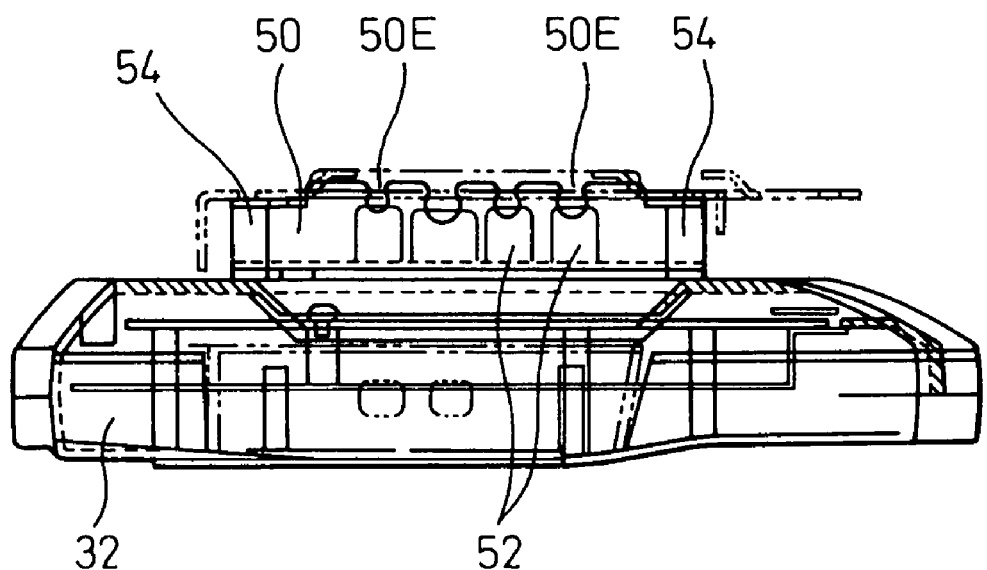
FIG. 7 is a side view of the keypad of FIG. 6.

FIG. 5 is a horizontal cross-sectional view of the display device 30 and the keypad 32 of FIG. 4 and corresponds to a view seen from the arrow V of FIG. 6. FIG. 6 is a plan view of the keypad 32 of FIG. 5. FIG. 7 is a side view of the keypad 32 of FIG. 6 seen from the arrow VII of FIG. 6. The cable holder 50 is arranged behind the keypad 32.

Figure 8:
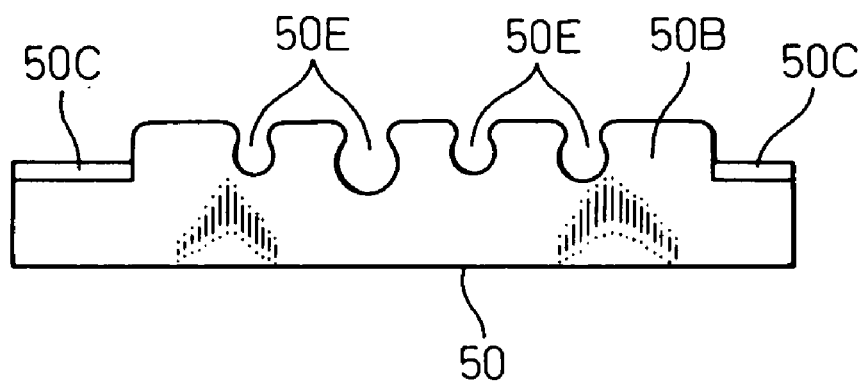
FIG. 8 is an enlarged side view of the cable holder of FIG. 7.
Figure 9:
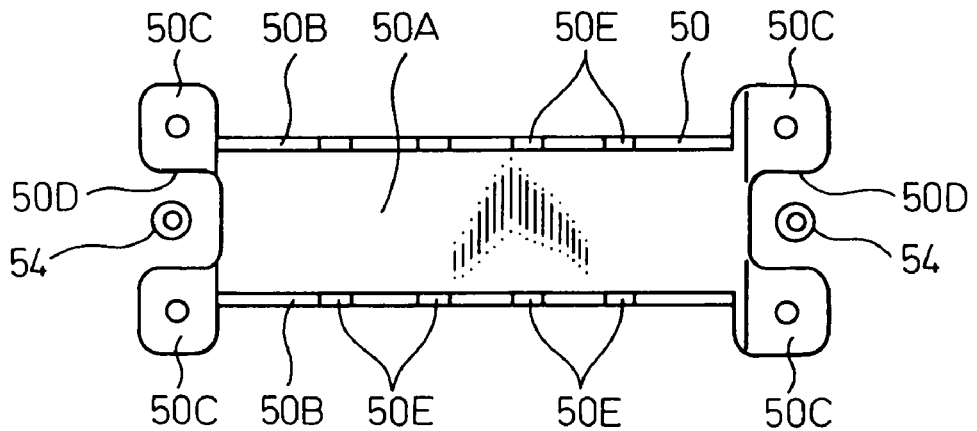
FIG. 9 is a plan view of the cable holder of FIG. 8.
Figure 10:
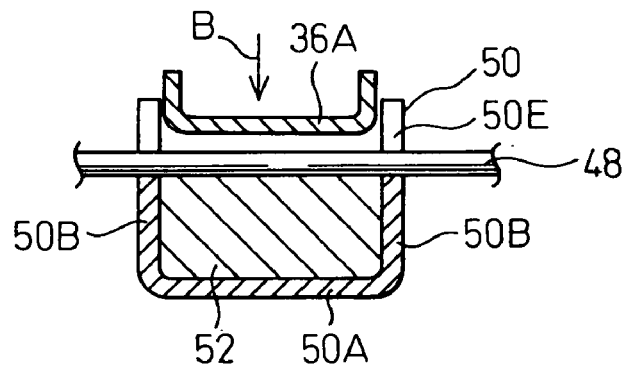
FIG. 10 is a cross-sectional view of the cable holder of FIGS. 8 and 9.

Further, FIG. 8 is an enlarged side view of the cable holder 50 of FIG. 7. FIG. 9 is a plan view of the cable holder 50 of FIG. 8. FIG. 10 is an enlarged cross-sectional view of the cable holder 50 of FIG. 8 and FIG. 9.

In FIGS. 5 to 10, in particular in FIGS. 8 to 10, the cable holder 50 has a bottom part 50A, a pair of parallel side wall parts 50B extending perpendicular to the bottom part 50A, and fixing parts 50C bent outward horizontally from positions slightly lower than the tops of the side wall parts 50B at the ends of the side wall parts 50B. The fixing parts 50C have screw holes. Recess shapes 50D are formed between the two fixed parts 50C at the ends of cable holder 50 in the longitudinal direction.

The side wall parts 50B have holding grooves 50E opened upward for holding the cables 48. One cable 48 is pushed into and held by a holding groove 50E comprised by the pair of aligned parallel side wall parts 50B. A shield gasket 52 is inserted between the pair of parallel side wall parts 50B on to the bottom part 50A. The shield gasket 52 contacts the cables 48 when the cables 48 are held by the holding grooves 50E.

The keypad 32 has four fixing bosses 54 for fixing the holding plate 36 to the keypad. Among these, two fixing bosses 54 are in the region of the cable holder 50. The two fixing bosses 54 are also shown in FIG. 9. The cable holder 50 is designed so that the fixing bosses 54 enter the recess shapes 50D when arranged at the keypad 32. The fixing bosses 54 and recess shapes 50D have a clearance between them. The cable holder 50 is supported by the keypad 32 so as to be able to move in a limited range. Further, as shown in FIG. 4, the display device 30 has a bracket 56 fixed to it. The bracket 56 has fixing parts 58 having screw holes.

Further, as shown in FIG. 6, the keypad 32 has connectors 62A, 62B, 62C, and 62D to be connected to ends of the cables 48.

Figure 11:
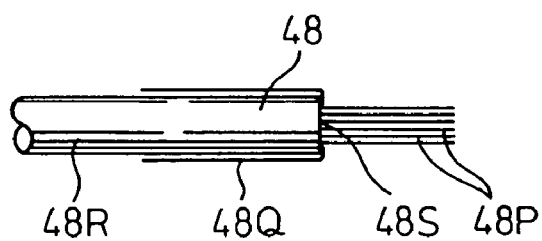
FIG. 11 is a view showing part of the cable.

FIG. 11 is a view of part of a cable. Each cable 48 is comprises a plurality of wires 48P, a shield braiding 48Q surrounding the plurality of wires 48P, and a covering 48R surrounding the shield braiding 48Q. The covering 48R is cut at the point 48S to expose the shield braiding 48Q. The exposed shield braiding 48Q is folded back on the covering 48R. A connector is attached to the front ends of the wires 48P.

Figure 12:
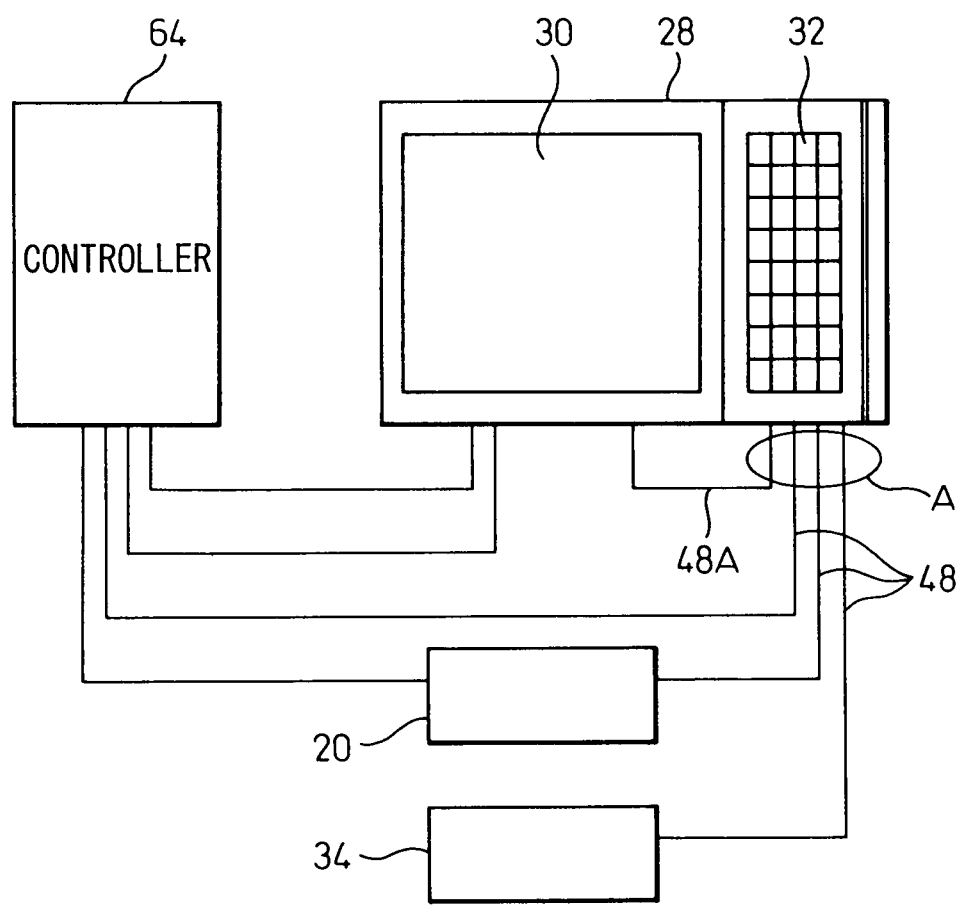
FIG. 12 is a wiring diagram of cables.

FIG. 12 is a wiring diagram of the cables. The cable 48A connects the keypad 32 and the display device 30. The cable 48B connects the keypad 32 and the scanning unit 20. The cable 48C connects the keypad 32 and the customer display 34. The cable 48D connects the keypad 32 and the controller 64 of the POS system. The cable 48A is connected to the connector 62A of FIG. 6, the cable 48B is connected to the connector 62B, the cable 48C is connected to the connector 62C, and the cable 48D is connected to the connector 62D. The region A of FIG. 12 is a region where the cable holder 50 is positioned.

As shown in FIG. 4, the holding plate 36 has a plurality of holes for passing the screws 66, 68, and 70. Further, the holding plate 36 has four openings provided so that the cables 48 are visible and has a contact part 36A formed in a bridge between the two openings at the left.

At the time of assembly of the scanner 14, the connectors of the cables 48 (48A to 48D) are first connected to the connectors 62 (62A to 62D) of the keypad 32. The cable holder 50 is arranged at the keypad 32 so that the fixing bosses 54 are located at the insides of the recess shapes 50D. Then, all of the cables 48 are pushed into the holding grooves 50E of the cable holder 50 so as to hold them. The cable holder 50 is arranged at the keypad 32 in a floating state.

Next, the holding plate 36 is mounted to the display device 30 and the keypad 32 (electronic multipurpose keyboard 28). At this time, the screws 66 are passed through the holes in the holding plate 36 and screwed into the screw holes of the fixing bosses 54, while the screws 68 are passed through the holes in the holding plate 36 and screwed into the screw holes of the fixing parts 58 of the bracket 56. Due to this, the holding plate 36 is fixed to the display device 30 and the keypad 32. Then, the screws 70 are passed through the holes of the holding plate 36 and screwed into the screw holes of the fixing parts 50C of the cable holder 50. The cable holder 50 is fixed to the holding plate 36 by this.

In this assembly work, when mounting the holding plate 36 to the display device 30 and the keypad 32, the plurality of cables 48 are held by the cable holder 50 and the cable holder 50 is arranged in a floating state at the keypad 32. The cable holder 50 can move, but is held at a substantially constant position. Therefore, the plurality of cables 48 are held together at a substantially predetermined position at the time of assembly, so do not interfere with the assembly work. Further, the cables 48 are never pinched. Even in a narrow work environment, the holding plate 36 can be quickly mounted to the display device 30 and the keypad 32 and therefore the work efficiency at assembly is improved.

The cable holder 50 is arranged at a substantially predetermined position of the keypad 32, so the cable holder 50 can be easily fixed to the holding plate 36. After being fixed, the cables 48 are held fixed with respect to the holding plate 36. After that, the cables 48 will no longer be rubbed against.

The cables 48 are extended outside of the holding plate 36 from the cutaway part 36B of the bottom right of the holding plate 36, but at that time the cables 54 are held by the cable holder 50 in a floating state, so the cables 48 are not subjected to unreasonable force. To position the cable holder 50 with respect to the keypad 32, the fixing bosses 54 are utilized. There is no need to provide special members at the keypad 32.

In the processes in the latter half of the assembly, the holding plate 36 to which the display device 30 and the keypad 32 are mounted is attached to the hinge support member 40. The hinge support member 40 is attached to the base 38. The cables 48 extended outside of the holding plate 36 from the cutaway part 36B at the bottom right of the holding plate 36 are inserted into the opening 22A of the top of the main body 22 and connected to the related connectors of the main body 22. Then, the covers 44, 45, and 46 are attached.

As shown in FIGS. 5 and 10, the contact part 36A of the holding plate 36 is formed so as to enable entry between the pair of side wall parts 50B of the cable holder 50. When attaching the holding plate 36 to the keypad 32, the contact part 36A advances toward the cable holder 50 in the direction of the arrow B of FIG. 10 and forcibly contacts the cables 48 held at the holding grooves 50E. More specifically, the parts of the shield braidings 48Q exposed by being folded back on the coverings 48R explained with reference to FIG. 11 are positioned on the cable holder 50. The contact part 36A is designed to forcibly contact the shield braidings 48Q of the cable 48. As a result, the shield braidings 48Q of the cables 48 are sandwiched between the shield gasket 52 and the contact part 36A of the holding member 36.

The holding plate 36 and the cable holder 50 are made of metal. The shield gasket 52 is made of a conductive material having elasticity. The shield braiding 48Q of the cable 48 is connected to a field ground inside the body 22. Therefore, the static electricity picked up at the surface of the housing of the display device 30 and the keypad 32 flows through the cable holder 50, the holding plate 36, and the shield braiding 48Q of the cable 48 to the field ground inside the body 22. Therefore, the display device 30 and the keypad 32 can operate normally without being affected by the static electricity picked up at the housing surface.

As explained above, according to the present invention, it is possible to obtain a scanner superior in work efficiency at the time of assembly.

The invention claimed is:

1. A scanner comprising a body having a scanning unit, a display device, a keypad, a holding member holding together said display device and said keypad, a mounting structure mounting said holding member to said body, and a cable holder having a holding part holding a plurality of cables and arranged in a floating state at one of said keypad and said display device, wherein said holding member has a contact part brought into contact with cables held by said cable holder when said holding member is attached to said keypad, each of said cables include a plurality of wires, a shield braiding surrounding said wires, and a covering surrounding said shield braiding, and said contact part of said holding member contacts said shield braidings of said cables and wherein the shield braiding of each cable is folded back on the covering and said contact part of said holding member contacts the parts of the shield braidings of said cables folded back on the coverings.

2. A scanner as set forth in claim 1, wherein said cable holder is arranged at said keypad and is fixed to said holding member when said holding member is attached to said keypad.

3. A scanner as set forth in claim 2, wherein a fixing member fixing said keypad to said cable holder is positioned in a region of said cable holder.

4. A scanner as set forth in claim 3, wherein said fixing member comprises a boss having a screw hole.

5. A scanner as set forth in claim 4, wherein said cable holder has a recess shape cooperating with said boss so as to be able to move in a limited range.

6. A scanner as set forth in claim 1, wherein the holding part holding the plurality of cables of the cable holder comprises holding grooves and the contact part of said holding member forcibly contacts the shield braidings of the cables held at said holding grooves when said holding member is moved toward said keypad.

7. A scanner as set forth in claim 6, further comprising a shield gasket arranged at said cable holder, said shield braidings of said cables being sandwiched between said shield gasket and said contact part of said holding member.

8. A scanner as set forth in claim 1, wherein said display device and said keypad are held side by side by said holding member and are supported by said body above said scanning unit.

9. A scanner as set forth in claim 1, further comprising a customer display attached to a body of the scanning unit.

* * * * *